United States Patent
Belogolovy et al.

(10) Patent No.: US 12,003,722 B2
(45) Date of Patent: Jun. 4, 2024

(54) ENCODING APPARATUS, ENCODING DEVICE, ENCODING METHOD, COMPUTER PROGRAM, AND CORRESPONDING COMPUTER SYSTEM

(71) Applicant: Intel Corporation, Santa Clara, CA (US)

(72) Inventors: Andrey Belogolovy, Hillsboro, OR (US); Evgeny Stupachenko, San Jose, CA (US); Niranjan Mylarappa Gowda, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/657,636

(22) Filed: Apr. 1, 2022

(65) Prior Publication Data
US 2022/0224899 A1    Jul. 14, 2022

(51) Int. Cl.
*H04N 19/12*    (2014.01)
*A63F 13/355*    (2014.01)
(Continued)

(52) U.S. Cl.
CPC ........... *H04N 19/12* (2014.11); *A63F 13/355* (2014.09); *H04N 19/103* (2014.11);
(Continued)

(58) Field of Classification Search
CPC .... H04N 19/12; H04N 19/103; H04N 19/136; H04N 19/172; H04N 19/423;
(Continued)

(56) References Cited

U.S. PATENT DOCUMENTS

2005/0179572 A1* 8/2005 Winger .................. H04N 19/13
                                                                 375/E7.176
2011/0206125 A1* 8/2011 Chien .................. H04N 19/176
                                                                 375/E7.209
(Continued)

OTHER PUBLICATIONS

Nolan Nicholson: "Exploring "Negative Latency"", https:\\nolannicholson.com/2019/12/16/exploring-negative-latency.html.

*Primary Examiner* — Tracy Y. Li
(74) *Attorney, Agent, or Firm* — 2SPL Patent Attorneys PartG mbB; Yong Beom Hwang

(57) ABSTRACT

Examples relate to an encoding apparatus, encoding device, encoding method, computer program and to a corresponding computer system. An encoding apparatus comprises processing circuitry configured to encode at least two video streams to perform video compression encoding using one or more encoders, wherein the one or more encoders are each configured to deter-mine an encoding context based on the video stream processed by the respective encoder, the encoding context comprising at least one or more reference frames determined by the respective encoder. The processing circuitry is configured to store at least one of the encoding contexts determined by the one or more encoders in a shared memory portion of the memory circuitry that is accessible to the one or more encoders. The processing circuitry is configured to proceed, using the one or more encoders, with encoding the at least two video streams based on an encoding context stored in the shared memory portion.

21 Claims, 6 Drawing Sheets

(51) Int. Cl.
*H04N 19/103* (2014.01)
*H04N 19/136* (2014.01)
*H04N 19/172* (2014.01)
*H04N 19/423* (2014.01)

(52) U.S. Cl.
CPC ......... *H04N 19/136* (2014.11); *H04N 19/172* (2014.11); *H04N 19/423* (2014.11)

(58) Field of Classification Search
CPC .. H04N 19/164; H04N 19/177; H04N 19/192; A63F 13/355
See application file for complete search history.

(56) References Cited

U.S. PATENT DOCUMENTS

| 2012/0155546 | A1* | 6/2012 | Marpe | H04N 19/13 375/E7.123 |
|---|---|---|---|---|
| 2016/0337667 | A1* | 11/2016 | Nagaoka | H04N 19/91 |
| 2017/0078703 | A1* | 3/2017 | Ridge | H04N 19/119 |
| 2018/0288435 | A1* | 10/2018 | Boyce | G06T 11/003 |

* cited by examiner

US 12,003,722 B2

ENCODING APPARATUS, ENCODING DEVICE, ENCODING METHOD, COMPUTER PROGRAM, AND CORRESPONDING COMPUTER SYSTEM

BACKGROUND

As client-server application models appear in more and more areas, more applications require lowering of the end-to-end latency for user interactions. The most recent example of a new usage of a client-server application model is remote gaming. In the remote execution model, which is used in remote gaming, the application runs on the server, where its graphical output is compressed and sent to the client. Video compression can be lossless or lossy, depending on the implementation. For example, in many implementations, lossy H.264 or H.265 compression is used.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
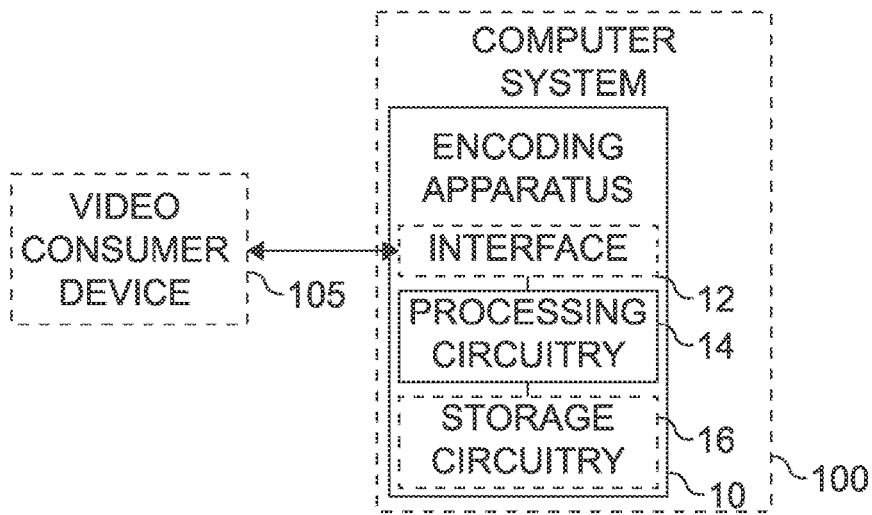
FIG. 1a shows a block diagram of an example of an encoding apparatus or encoding device, and of a computer system comprising such an encoding apparatus or encoding device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

FIG. 1a shows a block diagram of an example of an encoding apparatus 10 or encoding device 10, and of a computer system 100 comprising such an encoding apparatus or encoding device. The encoding apparatus 10 comprises circuitry that is configured to provide the functionality of the encoding apparatus 10. For example, the encoding apparatus 10 of FIG. 1a comprises (optional) interface circuitry 12, processing circuitry 14, memory circuitry 16, and (optional) storage circuitry 18. For example, the processing circuitry 14 may be coupled with the interface circuitry 12, with the memory circuitry 16, and with the storage circuitry 18. For example, the processing circuitry 14 may be configured to provide the functionality of the encoding apparatus, in conjunction with the interface circuitry 12 (for exchanging information, e.g., with other components of the computer system or a video consumer device 105 that is external to the computer system), the memory circuitry 16 (as working memory), and the storage circuitry 18 (for storing information). Likewise, the encoding device 10 may comprise means that is/are configured to provide the functionality of the encoding device 10. The components of the encoding device 10 are defined as component means, which may correspond to, or implemented by, the respective structural components of the encoding apparatus 10. For example, the encoding device 10 of FIGS. 1a and 1b comprises means for processing 14, which may correspond to or be implemented by the processing circuitry 14, memory 16, which may correspond to or be implemented by the memory circuitry 16, (optional) means for communicating 12, which may correspond to or be implemented by the interface circuitry 12, and (optional) means for storing information 18, which may correspond to or be implemented by the storage circuitry 18.

The processing circuitry 14 or means for processing 14 is configured to encode at least two video streams to perform video compression encoding using one or more encoders (e.g., two or more encoders). The one or more encoders are each configured to determine an encoding context based on the video stream processed by the respective encoder. The encoding context comprises at least one or more reference frames determined by the respective encoder. The processing circuitry 14 or means for processing 14 is configured to store at least one of the encoding contexts determined by the one or more encoders in a shared memory portion of the memory circuitry that is accessible to the one or more encoders. The processing circuitry 14 or means for processing 14 is configured to proceed, using the one or more encoders, with encoding the at least two video streams based on an encoding context stored in the shared memory portion.

FIG. 1a further shows a system comprising the encoding apparatus 10 or encoding device 10 and the video consumer device 105. In particular, the processing circuitry 14 or means for processing 14 of the encoding apparatus or encoding device may be configured to provide an encoded output video stream that is based on encoded frames of the one or more encoders to the video consumer device.

Figure 1B:
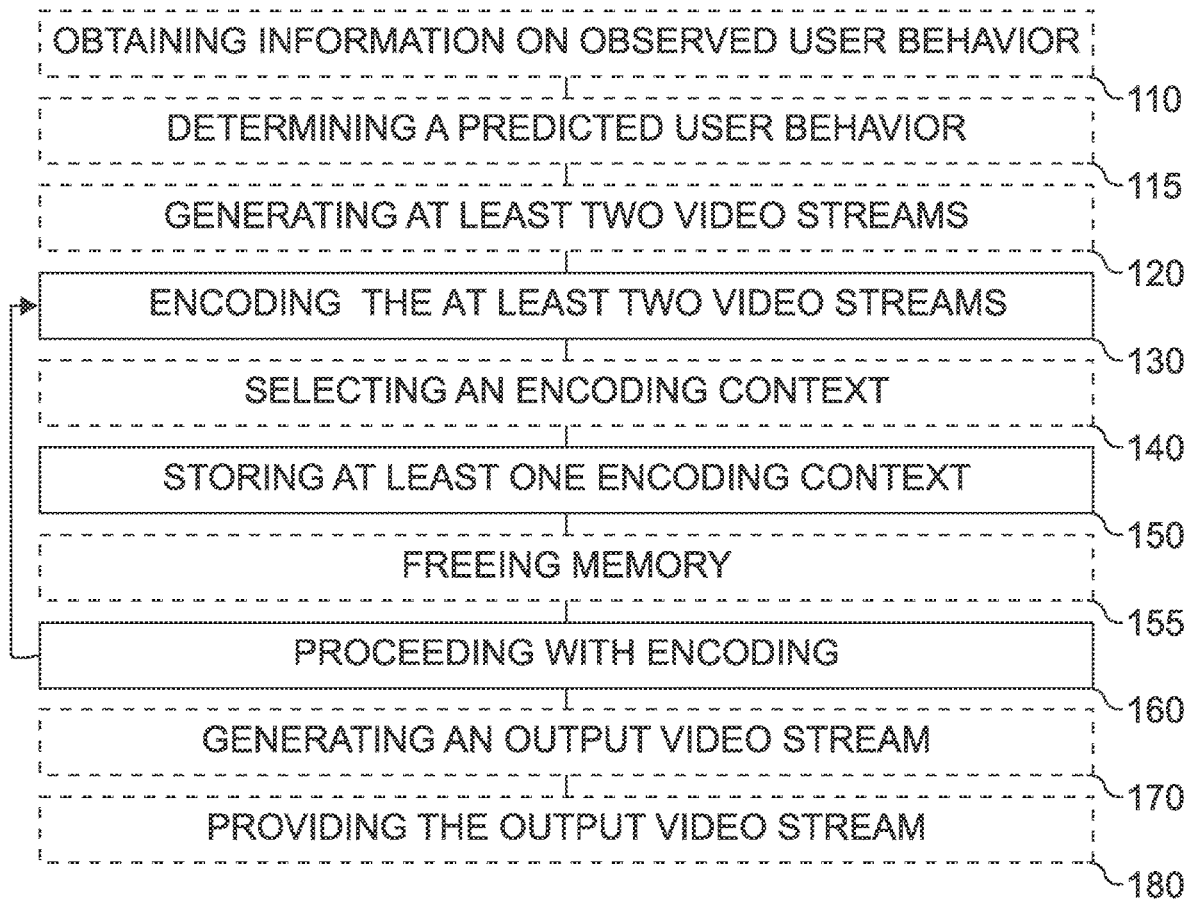
FIG. 1b shows a flow chart of an encoding method.

FIG. 1b shows a flow chart of a corresponding encoding method. The encoding method comprises encoding 130 the at least two video streams to perform video compression encoding using the one or more encoders (e.g., two or more encoders). The one or more encoders each determine an encoding context based on the video stream processed by the respective encoder. The encoding context comprises at least the one or more reference frames determined by the respective encoder. The encoding method comprises storing 150 at least one of the encoding contexts determined by the one or more encoders in the shared memory portion of the memory (circuitry) that is accessible to the one or more encoders. The encoding method comprises proceeding 160, using the one or more encoders, with encoding the at least two video streams based on an encoding context stored in the shared memory portion. For example, the encoding method may be performed by the computer system 100 shown in FIG. 1a. Accordingly, the system shown in FIG. 1a may comprise the computer system 100 being configured to perform the encoding method and the video consumer device 105, with the encoding method comprising providing 180 the encoded output video stream that is based on encoded frames of the one or more encoders to the video consumer device 105.

In the following, the functionality of the encoding apparatus, of the encoding device, of the encoding method, of a corresponding computer program, and of the computer system and system are introduced in more detail with respect to the encoding apparatus, computer system and system. Features introduced in connection with the encoding apparatus, computer system and system may likewise be included in the corresponding encoding device, encoding method and computer program.

The present disclosure relates to an encoding apparatus, encoding device, encoding method and computer program. In particular, an encoding concept is provided, which is suitable in different applications. For example, the proposed encoding concept may be used in applications, where two encoders are used to compress more than two video streams, or where the two encoders are used with different quality settings. In the following, however, the concept is introduced with respect to the application of the concept to low-latency remote application execution, e.g., for cloud gaming. While the proposed concept is primarily introduced with respect to the application of the concept to low-latency cloud gaming, the same concept may likewise be adapted to the aforementioned compression of more than two video streams by two encoders, or the encoding with different compression settings.

As outlined above, while not limited to this particular example, the proposed concept is particularly suitable with respect to low-latency cloud gaming. In cloud gaming, to improve the latency, a prediction may be made with respect to the behavior of the user. In particular, the user behavior being referenced herein may relate to a behavior of the user in a cloud video game. For example, many games, such as 3D shooters, strategy games or role-playing games, are controlled via mouse input. Depending on the mouse input, the images being shown as part of the video stream change, e.g., as a mouse cursor moves across the screen, or as the field of view changes in line with the mouse input. Similarly, if a gamepad is used, depending on the direction and extent of the movement of the control sticks, the field of view changes or a selector is moved across the screen. This user input, or more generally user behavior, e.g., of the mouse input or of the control stick input, may be predicted some amount of time into the future (e.g., 10 to 25 ms into the future), to reduce the latency accordingly (in case the prediction is correct). Accordingly, the game may be controlled based on the predicted behavior (i.e., input) of the user, and video frames of a video stream may be generated based on the prediction. Once the actual observed user behavior of the point in time in the future is received, the prediction may be compared to the observed behavior. If the prediction matches the observed user behavior (e.g., within some tolerance range), the video frames that are generated based on the predicted user behavior may be used. This video stream may also be denoted "predicted" video stream. However, if the prediction is incorrect, those frames might not be used, as they do not correspond to the observed behavior of the user. Instead, a second video stream may be generated that is based (only) on the observed behavior, e.g., without using the prediction to extrapolate the behavior of the user into the future. In other words, a first video stream of the at least two video streams may be based on the predicted user behavior and a second video stream of the at least two video streams may be based on an observed user behavior. If the observed user behavior does not match the predicted user behavior (within the aforementioned tolerance range), the video stream that is based on the observed behavior may be used instead. This video stream may also be denoted "fallback" video stream.

As is evident, the predicted video stream is based on the behavior of the user, e.g., the actions taken by the user (e.g., by moving the mouse or controlling the control sticks).

Therefore, the observed user behavior (i.e., the behavior of the user, such as the input of the user, as observed at the video consumer device 105) may be obtained from the video consumer device 105. In other words, the processing circuitry may be configured to obtain information on the observed user behavior from the video consumer device 105. Accordingly, as further shown in FIG. 1b, the encoding method may comprise obtaining 110 the information on the observed user behavior from the video consumer device 105. For example, the observed user behavior may comprise information on actions taken by the user at the video consumer device, such as mouse movement, button presses, and/or control stick movement or control stick orientation.

This information on the observed user behavior may be used for at least one of the following three purposes—to determine the predicted user behavior, to compare the predicted user behavior (at a point in time) with the observed user behavior (at the point in time), and to generate the predicted and fallback video stream. These tasks may be performed by the encoding apparatus or by one or more different entities.

In the following, it is assumed, that the encoding apparatus is also used to generate the at least two video streams. For example, the processing circuitry may be configured to generate the at least two video streams based on the information on the observed user behavior. Accordingly, as further shown in FIG. 1b, the encoding method may comprise generating 120 the at least two video streams based on the information on the observed user behavior. For example, the second video stream may be based on the observed user behavior (up to a first point in time) and the first video stream may be based on the predicted user behavior (up to a second point in time). For example, the second point in time may be later than the first point in time. As the first video stream may be generated based on the predicted user behavior, the predicted user behavior may be generated by the encoding apparatus as well. For example, the processing circuitry may be configured to determine the predicted user behavior based on the information on the observed user behavior. The processing circuitry may be configured to generate the first video stream based on the predicted user behavior. Accordingly, as further shown in FIG. 1b, the encoding method may comprise determining 115 the predicted user behavior based on the information on the observed user behavior. The encoding method may comprise generating 120 the first video stream based on the predicted user behavior. For example, time-series projection (i.e., (univariate) time-series forecasting or (univariate) time-series extrapolation) or a machine-learning model being trained to output a predicted user behavior based on the observed user behavior may be used to determine the predicted user behavior. For example, the machine-learning model may be trained, using supervised learning, using the observed user behavior over a plurality of points in time as training input, and using the observed user behavior at a point in time in the future relative to the plurality of points in time as desired training output.

Using the observed and predicted user behavior, the first and second video stream may be generated. For example, the processing circuitry may be configured to generate the at least two video streams using a video game engine, with the first video stream being generated based on the predicted user behavior and the second video stream being generated based on the observed user behavior. Accordingly, the encoding method may comprise generating 120 the at least two video streams using a video game engine, with the first video stream being generated based on the predicted user behavior and the second video stream being generated based on the observed user behavior (without using the predicted user behavior). For example, both the predicted and the observed user behavior may be used as input to a video game using the video game engine, and two different video streams may be generated by the video game engine based on the predicted and observed user input. For example, the state of the video game that is based on the predicted user behavior may be discarded after generating the first video stream, and the state of the video game that is based on the observed user behavior may define the actual state of the video game.

Alternatively, the at least two video streams, and the predicted user behavior, may be generated by a different entity, e.g., a video generation apparatus, with the encoding apparatus being the recipient of the resulting video streams and predicted user behavior.

Regardless of how and where the video streams are generated, they are then encoded by the encoding apparatus. In this context, the term encoding refers to video compression encoding, for example lossless video compression encoding or lossy video compression encoding. For example, the at least two video streams may be uncompressed video streams. For example, the video stream may be encoded using a video compression algorithm, such as H.264, H.265, WebM or AV1. For this purpose, the one or more encoders, e.g., two or more encoders, are used. In this context, the term "encoder" may refer to an instance of an encoding library or encoding application being configured to perform the encoding, or to a hardware encoder or hardware encoding functionality of a Central Processing Unit (CPU), Graphics Processing Unit (GPU) or application-specific encoding unit of the computer system 100. For example, in the cloud gaming example listed above, a first encoder may be used to encode the first video stream, and a (separate) second encoder may be used to encode the second video stream. In this case, the number of video streams may equal the number of encoders. This is also the case if the two encoders operate on identical video streams or video streams that (only) differ with respect to (spatial) resolution (i.e., if the at least two video streams are identical or (only) differ with respect to resolution), and the (one or more) encoders operate with different quality settings (e.g., to obtain frames with different frame sizes). Alternatively, the one or more encoders may be used in a round-robin fashion, such that they alternatingly encode frames from more different video sources. In other words, the number of video streams may be greater than the number of encoders, with the one or more encoders being configured to perform encoding context switching on a frame-for-frame basis using the encoding contexts stored in the shared memory portion.

Figure 3:
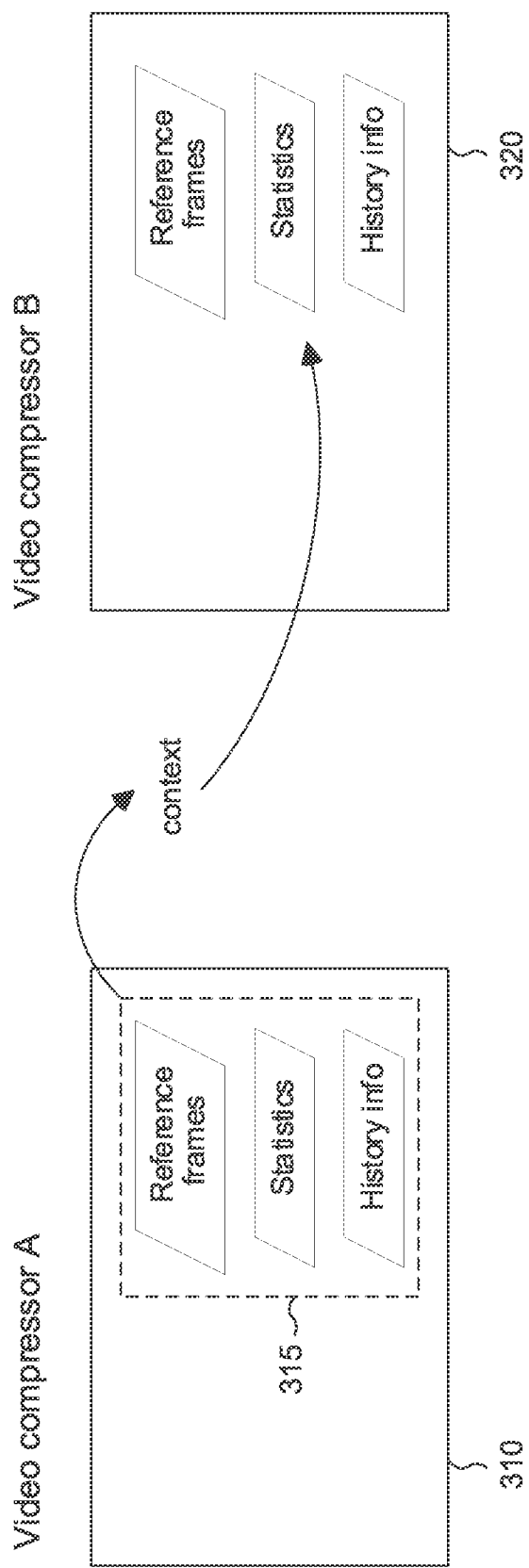
FIG. 3 shows a schematic diagram of an example illustrating the principle of context switching.

In modern video compression encoding, the frames of the video streams are generally not compressed in a stateless, frame-by-frame, manner. Instead, the (one or more) encoders, and eventually the decoders when the encoded video stream is being played back, use a stateful approach, by maintaining a so-called context, which comprises information about the frames of the video stream that were encoded previously. As shown in FIG. 3, such a context may include the respective reference frame (or reference frames), statistics, and historical information. In other words, the encoding context may comprise the reference frame and encoding statistics (and historical information on previously encoded frames). On both the encoder side and the decoder side, this context, which is based on the previously encoded or decoded frames, is maintained, and subsequent frames are encoded or decoded based on the encoding context up to that point in time. Since the encoding context is also maintained at the decoder, the amount of bytes required to encode individual frames can be decreased substantially. However, this also means that switching, on a frame-per-frame basis between the output of two decoders, may not be trivially possible, as shown in connection with FIG. 5*a*. Instead, if the proposed concept is used to enable switching between two encoders on a frame-per-frame basis, depending on which encoded frame is selected, the encoding context of the encoder that has generated the frame not being selected may be replaced with the encoding context of the encoder that has generated the frame being selected Accordingly, the encoding apparatus may perform a selection process. For example, the processing circuitry may be configured to select one of the encoding contexts determined by the one or more encoders, and to proceed with encoding the at least two video streams based on the selected encoding context. Accordingly, as further shown in FIG. 1*b*, the encoding method may comprise selecting 140 one of the encoding contexts determined by the one or more encoders and proceeding 160 with encoding the at least two video streams based on the selected encoding context. For example, in the above-reference example with respect to two different quality settings or with respect to the cloud gamin scenario, the encoding context may be selected based on which of the encoded frames is transmitted to a recipient of the encoded video stream, which may in turn be based on the data transmission bandwidth of a data connection between the computer system comprising the encoding apparatus and the recipient of the encoded video stream. For example, in the above-reference example with respect to the round-robin approach, the encoding context may be selected based on which video stream supplies the frame that is to be encoded next.

In the above-referenced cloud gaming example, the selection may be made based on which of the (previous) encoded frames is transmitted to the video consumer device, i.e., is used for generating an output video stream. This determination, in turn, is based on whether the predicted user behavior corresponds to the observed user behavior. In other words, the selection may be made based on a difference between the predicted user behavior and the observed user behavior. In other words, the encoding context may be selected based on the difference between the predicted user behavior and the observed user behavior. Correspondingly, the encoded frames being used for the output video stream may be selected based on the difference between the predicted user behavior and the observed user behavior. In particular, the selection or selections may be based on a difference between the predicted user behavior up to the second point in time and the observed user behavior up to the second point in time. For example, if the predicted user behavior differs (at all, or at least a predefined threshold value) from the observed user behavior, the encoding context (and/or frame) that is generated based on the second video stream may be selected. For example, if the predicted user behavior corresponds to (e.g., within the pre-defined threshold value) the observed user behavior, the encoding context (and/or frame) that is generated based on the first video stream may be selected.

The proposed concept may use one of at least two different concepts for storing and/or switching the encoding contexts of the respective encoders. In particular, at least one of the encoding contexts is stored in the shared memory portion, which is accessible to (all of) the encoders. For example, the shared memory portion may be a memory region that is mapped into the address space of (each of) the encoders, or, if the (one or more) encoders are implemented as different threads of a common process, a memory region of the common process that is accessible to the different threads of the process. For example, the shared memory portion may be a portion of memory provided by a volatile memory circuitry or persistent memory circuitry.

In a first concept, a pointer-based approach may be used to share the encoding context among the one or more encoders. In this concept, each of the one or more encoders may store their respective context in the shared memory portion, and a pointer may be used to point at one of the encoding contexts stored in the shared memory. In other words, the processing circuitry may be configured to store each of the determined encoding contexts in the shared memory portion, and to update a pointer based on the selected encoding context. Accordingly, the encoding method may comprise storing each of the determined encoding contexts in the shared memory portion, and updating the pointer based on the selected encoding context. This pointer, in turn, may then be used to access the selected context when encoding the subsequent frame (i.e., when proceeding with encoding the respective video stream). In other words, the pointer may be used by each of the one or more encoders to access the selected encoding context. Contexts that are no longer relevant, e.g., as another context has been selected in the cloud gaming or different quality settings examples, may be discarded, and the respective sub-portion of the shared memory may be freed. For example, the processing circuitry may be configured to free memory used for encoding contexts that have not been selected. Accordingly, the encoding method may comprise freeing 155 memory used for encoding contexts that have not been selected.

Figure 4:
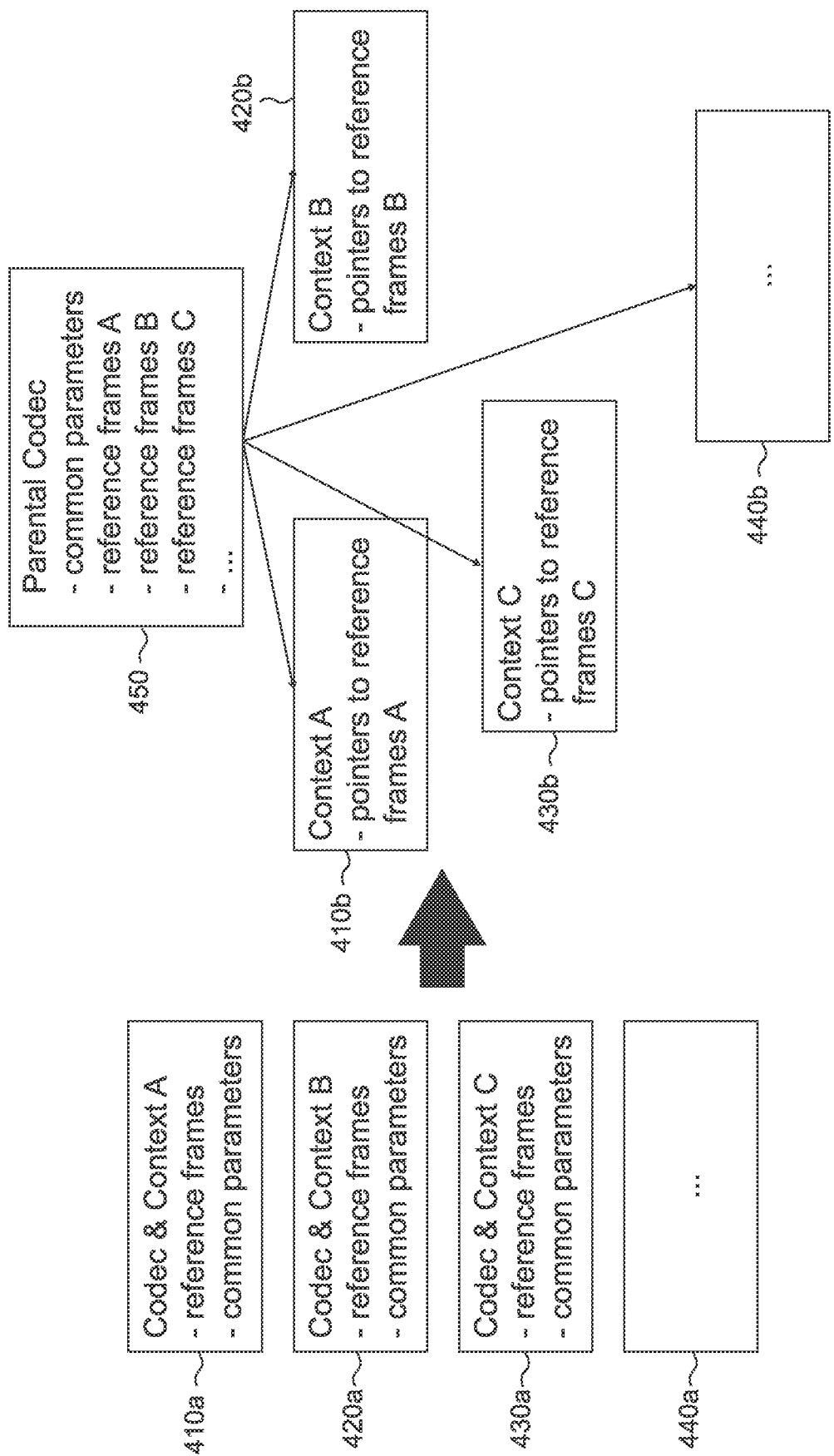
FIG. 4 shows a schematic diagram of an example of a proposed hierarchy for a context copy/swap implementation.

In terms of software implementation, the respective contexts may be accessed by defining a parental class and object, where common parameters and the encoding contexts are stored and accessible for the different contexts, and child object instances, where the pointer to the encoding contexts (e.g., reference frames) are stored in used to access the encoding contexts stored in the parental class and object. An example for this approach is shown in FIG. 4, for example.

In a second concept, (only) the selected concept is copied into the shared memory portion, and may e.g., be accessed via a pre-defined memory address. In other words, the processing circuitry may be configured to store exclusively the selected encoding context in the shared memory portion. Accordingly, the encoding method may comprise storing exclusively the selected encoding context in the shared memory portion. For example, the previously used context may be overwritten, or a ring-buffer-like structure may be used.

The encoding context that is stored in the shared memory portion is then used to encode subsequent frames of the at least two video streams. In other words, the processing circuitry is configured to proceed, using the one or more encoders, with encoding the at least two video streams based on an encoding context stored in the shared memory portion. For example, a subsequent frame of the at least two video streams may be encoded based on the encoding context stored in the shared memory portion. In particular, each of the one or more encoders may be configured to use the selected encoding context to proceed with encoding, e.g., in the cloud gaming example or in the example, where different quality frames are generated. For example, the encoding context being used may be selected and/or updated on a frame-per-frame basis.

The encoded frames are then used to generate at least one encoded output video stream. For example, the processing circuitry may be configured to generate an encoded output video stream based on encoded frames of the one or more encoders. The processing circuitry may be configured to provide the output video stream, e.g., to a consumer video device. Accordingly, as further shown in FIG. 1b, the encoding method comprises generating 170 the encoded output video stream based on encoded frames of the one or more encoders. The encoding method may comprise providing 180 the output video stream, e.g., to a consumer video device. For example, in the cloud gaming example or the example, where different quality frames are generated, one of the encoded frames may be selected for the encoded output video stream. The selection of the encoded frame may be implemented similar to the selection of the encoding context and be based on the data transmission bandwidth of a data connection between the computer system comprising the encoding apparatus and the recipient of the encoded video stream or based on the difference between the predicted user behavior and the observed user behavior. In other words, the encoded frames may be selected in line with the selection of the encoding context. For example, the encoded frames may be selected based on the data transmission bandwidth of a data connection between the computer system comprising the encoding apparatus and the recipient of the encoded video stream. Alternatively, the encoded frames may be selected based on the difference between the predicted user behavior and the observed user behavior. With respect to the round-robin-based examples, each of the encoded frames may be output to a corresponding output video stream that is based on the video stream being encoded.

For example, the computer system 100 may be a workstation computer system or a server computer system. The video consumer device 105 may be a mobile device (such as a smartphone, a tablet computer, or a handheld gaming console), a gaming console, a laptop computer, a desktop computer, or a set-top box.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the memory circuitry 16 or memory 16 may comprise volatile or non-volatile memory, e.g., circuitry for providing volatile or non-volatile memory. For example, the memory circuitry or memory 16 may be one or random-access memory (RAM), such as dynamic random-access memory (DRAM) or static random-access memory (SRAM), or persistent memory (PMEM).

For example, the storage circuitry 18 or means for storing information 16 may comprise at least one element of the group of a computer readable storage medium, such as a magnetic or optical storage medium, e.g., a hard disk drive, a flash storage, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g., a classification algorithm, a regression algorithm, or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms but are based on learning from examples using a similarity function that measures how similar or related two objects are.

Machine-learning algorithms are usually based on a machine-learning model. In other words, the term "machine-learning algorithm" may denote a set of instructions that may be used to create, train, or use a machine-learning model. The term "machine-learning model" may denote a data structure and/or set of rules that represents the learned knowledge, e.g., based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some embodiments, the machine-learning model may be deep neural network, e.g., a neural network comprising one or more layers of hidden nodes (i.e., hidden layers), preferably a plurality of layers of hidden nodes.

Alternatively, the machine-learning model may be a support vector machine. Support vector machines (i.e., support vector networks) are supervised learning models with associated learning algorithms that may be used to analyze data, e.g., in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

More details and aspects of the encoding apparatus, encoding device, encoding method, computer program, computer system and system are mentioned in connection with the proposed concept, or one or more examples described above or below (e.g., FIGS. 2 to 6c). The encoding apparatus, encoding device, encoding method, computer program, computer system and system may comprise one or more additional optional features corresponding to one or more aspects of the proposed concept, or one or more examples described above or below.

Various examples of the present disclosure relate to a context switching mechanism for video compression, e.g., for low latency remote operation execution and remote gaming.

In a remote execution model, which is used in remote gaming, an application runs on the server, where its graphical output is compressed and sent to the client. Because the latency of remote execution is crucial for enabling workloads like gaming or virtual reality, to reduce the end-to-end latency, various optimization techniques are used. The most advanced technique is the use of server-side predictions of client. Using such predictions, client input data is simulated and sent to the application before the real user input data is received. In the case of the prediction being correct, the system can send the video output back to the client earlier. However, in the case of incorrect prediction, a mechanism for a "rollback" or a "backup plan" may be used, i.e., a way to return to the real user data and sending video based on it. So, in parallel with processing of predicted data, another output may be generated, and at the time of sending data back to the client, the more suitable variant is chosen.

To lower the latency even more, various examples of the present disclosure include or integrate video compression into the predicted execution chain and "rollback" execution chain, so at the time of decision making, the system may have two (or more) compressed video frames to choose from.

As at different moments in time, the prediction success/failure changes, "predicted" and "rollback" images change at the system output. In many cases "predicted" and "rollback" can change every output frame.

Figure 2:
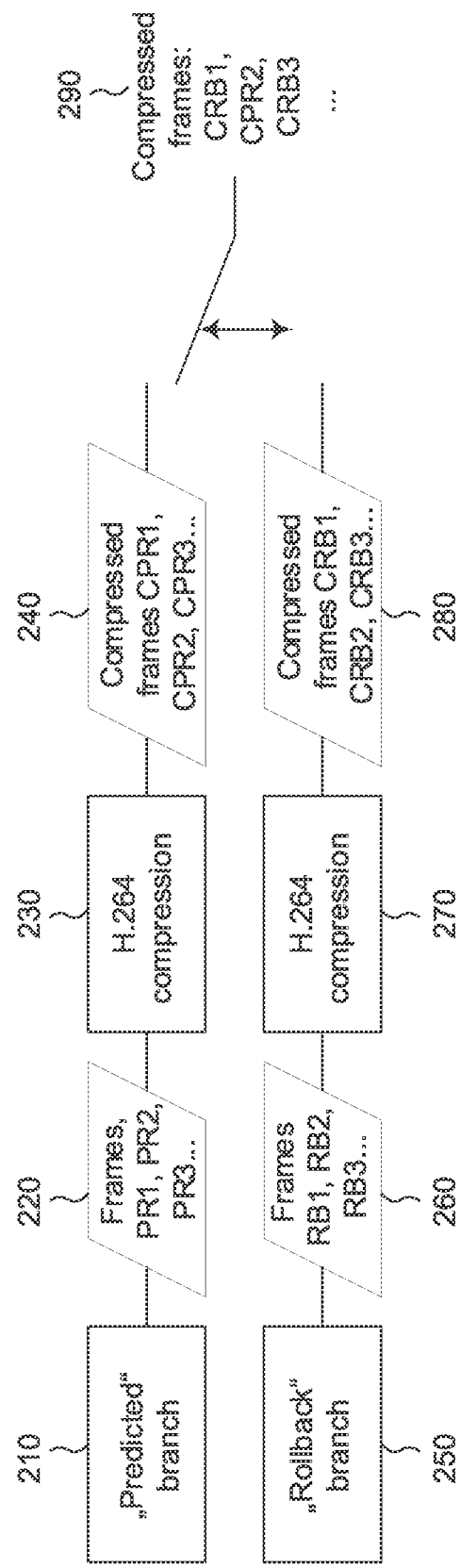
FIG. 2 shows a schematic diagram of an example of a combination of compressed frames in the case of prediction-based remote execution.

FIG. 2 shows a schematic diagram of an example of a combination (e.g., mixture) of compressed frames in the case of prediction-based remote execution. In FIG. 2, two branches are shown, the predicted branch 210 and the rollback branch 250. In the predicted branch 210, frames 220 PR1, PR2, PR3 . . . are generated and compressed 230 (e.g., using H.264 compression) to generate compressed frames 240 CPR1, CPR2, CPR3 . . . . In the rollback branch 250, frames 260 RB1, RB2, RB3 . . . are generated and compressed 270 (e.g., using H.264 compression) to generate compressed frames 280 CRB1, CRB2, CRB3 . . . . A switch is used to select between the compressed frames of the two branches, to generate a stream of compressed frames 290 selected from both branches (e.g., CRB1, CPR2, CRB3 . . . ).

H.264 or H.265 compression algorithms use reference frames to remove temporal redundancy in video (so called P or B frames). Inside the video compression module, frames from the video stream are stored to be used as references. If P-frames and compression are used and the compressed frames are only swapped before sending, the decompressor at the receiver might not be able to reconstruct the frames correctly, because the reference frames do not match (as the history of compressors is different since the input streams are different), so the entire model of putting the video encoder in the loop might not work (see examples of reconstructed images in FIGS. 5a to 5c).

To enable or improve the correct video compression operation inside the prediction-rollback scheme in remote application execution, a mechanism may be used to swap compression contexts in the compressors at the time of execution, for example, to replace a set of reference frames (or, more generally, the encoding context) from one compressor with a set from another. For example, after the system makes a decision to use the predicted application output, the encoding context of the compressor that corresponds to the predicted branch may be replicated into all other compressors. For example, the encoding context switch may be fast enough not to affect overall compression time.

The present disclosure provides a concept and mechanism for switching the video compressor context, i.e., to take the encoding context from one compressor and to "put" it into another compressor, so the other compressor may process the next frame that will appear at the input using (all) statistics and reference frames that were generated in the first compressor, as shown in FIG. 3.

FIG. 3 shows a schematic diagram of an example illustrating the principle of context switching. In the example, the encoding context 315 of video processor A 310 (including at least one of reference frames, statistics, and history information) is transferred to video compressor B 320. As a result, the video compressor B 320 may process the next frame like video compressor A would.

In software, the proposed context switching scheme may be implemented by controlled memory allocation, pointer-based memory access and by providing external interfaces to exchange pointers. In hardware, the proposed mechanism may be implemented similarly using a shared memory approach.

The proposed concept may enable putting the video compression inside the prediction-controlled loop in the remote applications that may enable multi-branch prediction for latency reduction as described above.

In addition, context switching in video compression can be applied in local applications that perform partial frame compression to multiple stream processing using pipelining schemes to implement ping-pong like scenarios. For example, if two compressors are used to handle ten streams on a frame-by-frame basis, after completion of the first frame, the compressor can save the encoding context and switch to another stream. When it is time to return back to the first stream, the compressor may load the encoding context and proceed with the stream data. Even if only implemented in software, this approach may be more efficient compared to instantiating ten copies of compressors, i.e., one per stream.

The proposed concept may also make possible two or more compressions of different quality, which may improve network rate control (by choosing the compressed frame with the most suitable size just before network transfer).

Video compression modules store their inner data like configuration parameters and local variables. At the time of processing, the video compression implementations allocate further memory blocks to store reference frames and statistics that are used by the compression algorithms. As this is information that is used internally by the compressors, access to such information is generally not provided to external entities. In general, the information remains in local variables and memory that are inaccessible.

In the proposed concept, the storage of such information is reorganized, e.g., by using an upper-level variable or pointer referred to as a context pointer (or context pointer class). The other algorithm-related memories and variables may be implemented as references from that context pointer. For example, this context pointer may have the following features or properties. For example, a context copy function may be provided that takes the encoding context pointer as an argument and copies (all) data from the reference context to the local context. This may be the most-used function. Moreover, a "getter"/"setter" function pair may be implemented in the class, providing external access to the inner context pointer. It may be used to enable context switching from the outer application. Block memory allocation for contexts may be implemented in a "smart pointer" way, i.e., a mechanism may be implemented to track memory allocation and free unreferenced blocks without direct calls to "free". This may be done to avoid memory leaks after context switching, as context pointers assume direct assignment options.

In the following, an example is given on how to deal with reference frames. The example may be extended to any other context/codec structure. In the following, it is assumed that there are several codecs and contexts to work with: A, B, C . . . . In the proposed concept, (all) memory management may be moved outside of the encoding contexts, ideally to some parental class, as shown in FIG. 4. FIG. 4 shows a schematic diagram of an example of a proposed hierarchy for a context copy/swap implementation. In FIG. 4, three combinations of codec and context are shown, codec and context A 410a, codec and context B 420a, and codec and context C 430a (and potentially additional combinations of codec and context 440a). Each codec and concept may comprise reference frames and common parameters. In the proposed concept, a parental codec 450 may be used, which includes the common parameters and the reference frames for A, B, C . . . . The respective contexts context A 410b, context B 420b, context C 430b and additional contexts 440b contain pointers to the respective reference frames stored in the parental coded class. The inheritance may be used to share access to reference frames between child contexts through the parental, but keep access closed for external use.

In addition to implemented methods for a codec and/or its context, the following methods may be implemented: For example, the method switchContexts(context A, context B)—may be implemented to swap contexts fields. The method may swap "A" and "B" history including pointers to reference frames. The method might not be responsible for managing memory allocated for swapped members. The method copyContext(context Src (source), context Dst (destination)) may be implemented to copy context fields from Src to Dst. The method may replace "Dst" history including pointers to reference frames with "Src". Since both methods for switching/swapping and copying of contexts switch or copy only pointers, the overall overhead may be reduced or minimized.

Sometimes it may be desired not to copy the entire context memory (including current frames, reference frames, context properties, and more), but just to copy references to memory. That may require a modification of a codec memory stack, expanding most of the structures in a codec to multiple versions (equal to number of current contexts) and adding a parental class to share memory with all child contexts (e.g., as shown in FIG. 4). With that modification, overhead on copying a child context may be reduced or minimized, to copying only some memory addresses. The proposed context memory sharing may be implemented efficiently since different context properties are supposed to be the same.

In various examples, the proposed context switching mechanism may be implemented using external interfaces (i.e., functions called externally or registers accessible from the outside), such as interfaces that provide access to inner compression contents (context) of a compression library or block. For example, one or more functions to save/output contexts to somewhere may be provided. For example, one or more functions that provide pointers to inner reference frames may be provided. For example, one or more memory allocation schemes may be provided that enforce all context related blocks and variables to be located nearby in the memory, so a single memory copy can replicate the entire context. However, the use of pointers may be preferable to copying the encoding context.

Figure 5A:
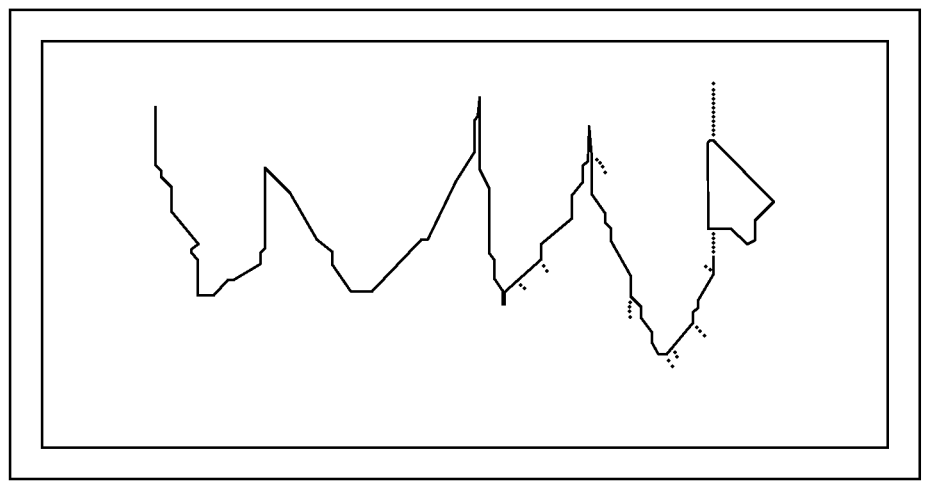
FIGS. 5a to 5c show schematic drawings of context switching results for video transfer with mouse prediction, without copying the encoding context.
Figure 5B:
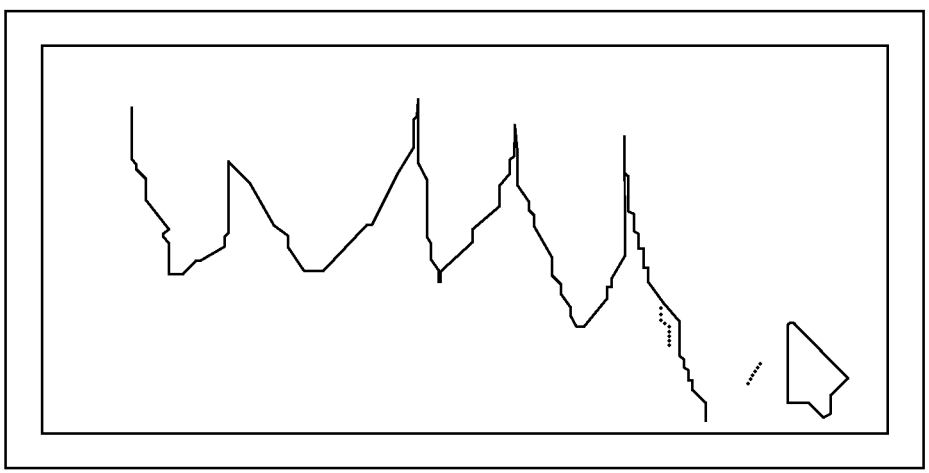
Figure 5C:
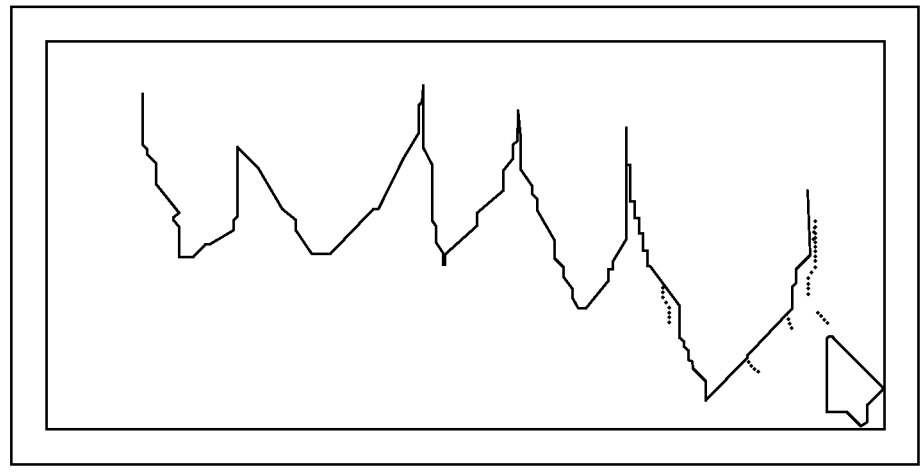
Figure 6A:
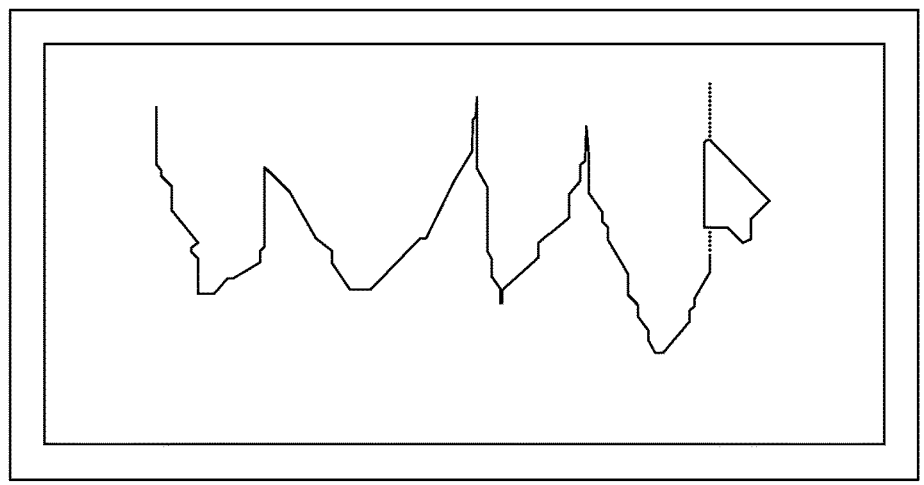
FIGS. 6a to 6c show schematic drawings of context switching results for video transfer with mouse prediction, with copying the encoding context.
Figure 6B:
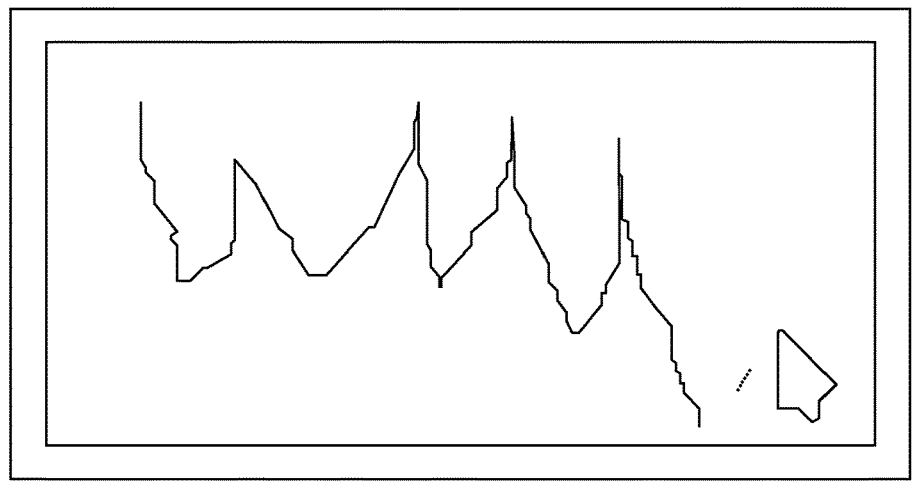
Figure 6C:
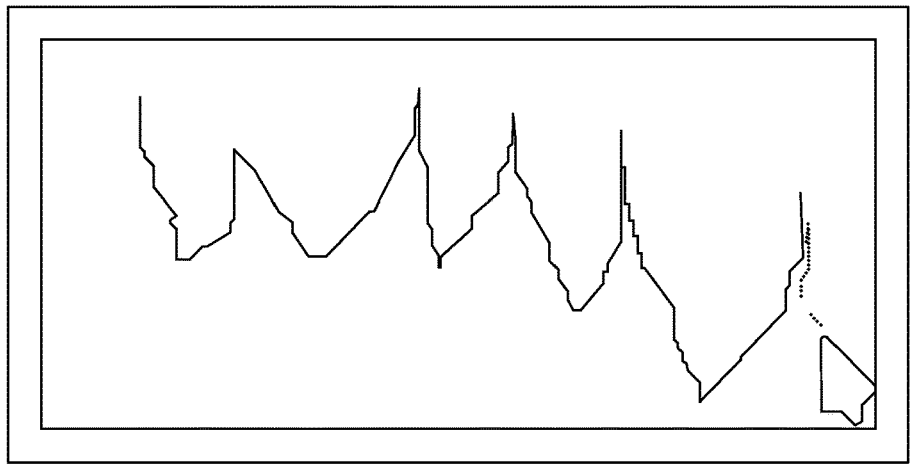

In the following, in FIGS. 5a to 5c and 6a to 6c, some implementation results are presented. FIGS. 5a to 5c show schematic drawings of context switching results for video transfer with mouse prediction, without copying the encoding context. FIGS. 6a to 6c show schematic drawings of context switching results for video transfer with mouse prediction, with copying the encoding context. The results are presented for a simple drawing application with 16 ms mouse prediction enabled. The application was running on a server and controlled from a client. The video was compressed, transferred through a network, decompressed, and displayed at the client. In FIGS. 5a to 5c, the resulting frames left without context copy are shown. In FIGS. 6a to 6c, the resulting frames with context copy (according to the proposed concept) are shown.

The dotted line indicates the predicted mouse movement. Wherever the prediction matches the observed mouse movement, the dotted line is overlaid with the solid line representing the observed mouse movement. The portions of the dotted line that are visible are artifacts due to absence of the context switching feature. As can be seen in FIGS. 5a to 6c, the frames shown in FIGS. 6a to 6c are clearer and do not include failed predictions from previous frames. Therefore, the invention may improve low latency video transfer quality with reduced overhead.

Various examples of the proposed concept may provide video compression with context copy/switch capability. Various examples of the present disclosure may provide a software implementation of the encoding context copy/switch with a reduced overhead. Various examples of the present disclosure may provide an implementation of video compression with context copy/switch for prediction-based latency reduction.

More details and aspects of the context switching mechanism for video compression are mentioned in connection with the proposed concept or one or more examples described above or below (e.g., FIG. 1a to 1b). The context switching mechanism for video compression may comprise one or more additional optional features corresponding to one or more aspects of the proposed concept, or one or more examples described above or below.

In the following, some examples are presented:

An example (e.g., example 1) relates to an encoding apparatus (10) comprising processing circuitry (14) and memory circuitry (16), the processing circuitry being configured to encode at least two video streams to perform video compression encoding using one or more encoders, wherein the one or more encoders are each configured to determine an encoding context based on the video stream processed by the respective encoder, the encoding context comprising at least one or more reference frames determined by the respective encoder. The processing circuitry is configured to store at least one of the encoding contexts determined by the one or more encoders in a shared memory portion of the memory circuitry that is accessible to the one or more encoders. The processing circuitry is configured to proceed, using the one or more encoders, with encoding the at least two video streams based on an encoding context stored in the shared memory portion.

Another example (e.g., example 2) relates to a previously described example (e.g., example 1) or to any of the examples described herein, further comprising that the one or more encoders are two or more encoders.

Another example (e.g., example 3) relates to a previously described example (e.g., one of the examples 1 to 2) or to any of the examples described herein, further comprising that the encoding context comprises the reference frame and encoding statistics.

Another example (e.g., example 4) relates to a previously described example (e.g., one of the examples 1 to 3) or to any of the examples described herein, further comprising that the processing circuitry is configured to select one of the encoding contexts determined by the one or more encoders, and to proceed with encoding the at least two video streams based on the selected encoding context.

Another example (e.g., example 5) relates to a previously described example (e.g., example 4) or to any of the examples described herein, further comprising that the processing circuitry is configured to store each of the determined encoding contexts in the shared memory portion, and to update a pointer based on the selected encoding context.

Another example (e.g., example 6) relates to a previously described example (e.g., example 5) or to any of the examples described herein, further comprising that the pointer is used by each of the one or more encoders to access the selected encoding context.

Another example (e.g., example 7) relates to a previously described example (e.g., one of the examples 5 to 6) or to any of the examples described herein, further comprising that the processing circuitry is configured to free memory used for encoding contexts that have not been selected.

Another example (e.g., example 8) relates to a previously described example (e.g., example 4) or to any of the examples described herein, further comprising that the processing circuitry is configured to store exclusively the selected encoding context in the shared memory portion.

Another example (e.g., example 9) relates to a previously described example (e.g., one of the examples 4 to 8) or to any of the examples described herein, further comprising that each of the one or more encoders is configured to use the selected encoding context to proceed with encoding.

Another example (e.g., example 10) relates to a previously described example (e.g., one of the examples 4 to 9) or to any of the examples described herein, further comprising that a first video stream of the at least two video streams is based on a predicted user behavior and a second video stream of the at least two video streams is based on an observed user behavior, wherein the encoding context is selected based on a difference between the predicted user behavior and the observed user behavior.

Another example (e.g., example 11) relates to a previously described example (e.g., example 10) or to any of the examples described herein, further comprising that the user behavior relates to a behavior of the user in a cloud video game.

Another example (e.g., example 12) relates to a previously described example (e.g., one of the examples 10 to 11) or to any of the examples described herein, further comprising that the second video stream is based on the observed user behavior up to a first point in time and the first video stream is based on the predicted user behavior up to a second point in time, with the second point in time being later than the first point in time, and with the selection being based on a difference between the predicted user behavior up to the second point in time and the observed user behavior up to the second point in time.

Another example (e.g., example 13) relates to a previously described example (e.g., one of the examples 10 to 12) or to any of the examples described herein, further comprising that the processing circuitry is configured to obtain information on the observed user behavior from a video consumer device (105).

Another example (e.g., example 14) relates to a previously described example (e.g., example 13) or to any of the examples described herein, further comprising that the processing circuitry is configured to generate the at least two video streams based on the information on the observed user behavior.

Another example (e.g., example 15) relates to a previously described example (e.g., example 14) or to any of the examples described herein, further comprising that the processing circuitry is configured to determine the predicted user behavior based on the information on the observed user behavior, and to generate the first video stream based on the predicted user behavior.

Another example (e.g., example 16) relates to a previously described example (e.g., one of the examples 14 to 15) or to any of the examples described herein, further comprising that the processing circuitry is configured to generate the at least two video streams using a video game engine, the first video stream being generated based on the predicted user behavior and the second video stream being generated based on the observed user behavior.

Another example (e.g., example 17) relates to a previously described example (e.g., one of the examples 10 to 16) or to any of the examples described herein, further comprising that the processing circuitry is configured to generate an encoded output video stream based on encoded frames of the one or more encoders, with the encoded frames being selected based on the difference between the predicted user behavior and the observed user behavior, and to provide the output video stream to a consumer video device.

Another example (e.g., example 18) relates to a previously described example (e.g., one of the examples 1 to 17) or to any of the examples described herein, further comprising that the number of video streams equals the number of encoders.

Another example (e.g., example 19) relates to a previously described example (e.g., one of the examples 1 to 17) or to any of the examples described herein, further comprising that the number of video streams is greater than the number of encoders, with the one or more encoders being configured to perform encoding context switching on a frame-for-frame basis using the encoding contexts stored in the shared memory portion.

An example (e.g., example 20) relates to a computer system (100) comprising the encoding apparatus (10) according to one of the examples 1 to 19 or any other example.

An example (e.g., example 21) relates to a system comprising the encoding apparatus (10) according to one of the examples 1 to 19 or any other example and a video consumer device (105), wherein the processing circuitry of the encoding apparatus is configured to provide an encoded output video stream that is based on encoded frames of the one or more encoders to the video consumer device.

An example (e.g., example 22) relates to an encoding device (10) comprising means for processing (14) and memory (16), the means for processing being configured to encode at least two video streams to perform video compression encoding using one or more encoders, wherein the one or more encoders are each configured to determine an encoding context based on the video stream processed by the respective encoder, the encoding context comprising at least one or more reference frames determined by the respective encoder. The means for processing is configured to store at least one of the encoding contexts determined by the one or more encoders in a shared memory portion of the memory that is accessible to the one or more encoders. The means for processing is configured to proceed, using the one or more encoders, with encoding the at least two video streams based on an encoding context stored in the shared memory portion.

Another example (e.g., example 23) relates to a previously described example (e.g., example 22) or to any of the examples described herein, further comprising that the one or more encoders are two or more encoders.

Another example (e.g., example 24) relates to a previously described example (e.g., one of the examples 22 to 23) or to any of the examples described herein, further comprising that the encoding context comprises the reference frame and encoding statistics.

Another example (e.g., example 25) relates to a previously described example (e.g., one of the examples 22 to 24) or to any of the examples described herein, further comprising that the means for processing is configured to select one of the encoding contexts determined by the one or more encoders, and to proceed with encoding the at least two video streams based on the selected encoding context.

Another example (e.g., example 26) relates to a previously described example (e.g., example 25) or to any of the examples described herein, further comprising that the means for processing is configured to store each of the determined encoding contexts in the shared memory portion, and to update a pointer based on the selected encoding context.

Another example (e.g., example 27) relates to a previously described example (e.g., one of the examples 25 to 26) or to any of the examples described herein, further comprising that the pointer is used by each of the one or more encoders to access the selected encoding context.

Another example (e.g., example 28) relates to a previously described example (e.g., one of the examples 25 to 27) or to any of the examples described herein, further comprising that the means for processing is configured to free memory used for encoding contexts that have not been selected.

Another example (e.g., example 29) relates to a previously described example (e.g., example 25) or to any of the examples described herein, further comprising that the means for processing is configured to store exclusively the selected encoding context in the shared memory portion.

Another example (e.g., example 30) relates to a previously described example (e.g., one of the examples 25 to 29) or to any of the examples described herein, further comprising that each of the one or more encoders is configured to use the selected encoding context to proceed with encoding.

Another example (e.g., example 31) relates to a previously described example (e.g., one of the examples 22 to 30) or to any of the examples described herein, further comprising that a first video stream of the at least two video streams is based on a predicted user behavior and a second video stream of the at least two video streams is based on an observed user behavior, wherein the encoding context is selected based on a difference between the predicted user behavior and the observed user behavior.

Another example (e.g., example 32) relates to a previously described example (e.g., example 31) or to any of the examples described herein, further comprising that the user behavior relates to a behavior of the user in a cloud video game.

Another example (e.g., example 33) relates to a previously described example (e.g., one of the examples 31 to 32) or to any of the examples described herein, further comprising that the second video stream is based on the observed user behavior up to a first point in time and the first video stream is based on the predicted user behavior up to a second point in time, with the second point in time being later than the first point in time, and with the selection being based on a difference between the predicted user behavior up to the second point in time and the observed user behavior up to the second point in time.

Another example (e.g., example 34) relates to a previously described example (e.g., one of the examples 31 to 33)

or to any of the examples described herein, further comprising that the means for processing is configured to obtain information on the observed user behavior from a video consumer device (105).

Another example (e.g., example 35) relates to a previously described example (e.g., example 34) or to any of the examples described herein, further comprising that the means for processing is configured to generate the at least two video streams based on the information on the observed user behavior.

Another example (e.g., example 36) relates to a previously described example (e.g., example 35) or to any of the examples described herein, further comprising that the means for processing is configured to determine the predicted user behavior based on the information on the observed user behavior, and to generate the first video stream based on the predicted user behavior.

Another example (e.g., example 37) relates to a previously described example (e.g., one of the examples 35 to 36) or to any of the examples described herein, further comprising that the means for processing is configured to generate the at least two video streams using a video game engine, the first video stream being generated based on the predicted user behavior and the second video stream being generated based on the observed user behavior.

Another example (e.g., example 38) relates to a previously described example (e.g., one of the examples 31 to 37) or to any of the examples described herein, further comprising that the means for processing is configured to generate an encoded output video stream based on encoded frames of the one or more encoders, with the encoded frames being selected based on the difference between the predicted user behavior and the observed user behavior, and to provide the output video stream to a consumer video device.

Another example (e.g., example 39) relates to a previously described example (e.g., one of the examples 22 to 38) or to any of the examples described herein, further comprising that the number of video streams equals the number of encoders.

Another example (e.g., example 40) relates to a previously described example (e.g., one of the examples 22 to 38) or to any of the examples described herein, further comprising that the number of video streams is greater than the number of encoders, with the one or more encoders being configured to perform encoding context switching on a frame-for-frame basis using the encoding contexts stored in the shared memory portion.

An example (e.g., example 41) relates to a computer system (100) comprising the encoding device (10) according to one of the examples 22 to 40 or any other example.

An example (e.g., example 42) relates to a system comprising the encoding device (10) according to one of the examples 22 to 40 or any other example and a video consumer device (105), wherein the means for processing of the encoding device is configured to provide an encoded output video stream that is based on encoded frames of the one or more encoders to the video consumer device.

An example (e.g., example 43) relates to an encoding method comprising encoding (130) at least two video streams to perform video compression encoding using one or more encoders, wherein the one or more encoders each determine an encoding context based on the video stream processed by the respective encoder, the encoding context comprising at least one or more reference frames determined by the respective encoder. The encoding method comprises storing (150) at least one of the encoding contexts determined by the one or more encoders in a shared memory portion of memory that is accessible to the one or more encoders. The encoding method comprises proceeding (160), using the one or more encoders, with encoding the at least two video streams based on an encoding context stored in the shared memory portion.

Another example (e.g., example 44) relates to a previously described example (e.g., example 43) or to any of the examples described herein, further comprising that the one or more encoders are two or more encoders.

Another example (e.g., example 45) relates to a previously described example (e.g., one of the examples 43 to 44) or to any of the examples described herein, further comprising that the encoding context comprises the reference frame and encoding statistics.

Another example (e.g., example 46) relates to a previously described example (e.g., one of the examples 43 to 45) or to any of the examples described herein, further comprising that the encoding method comprises selecting (140) one of the encoding contexts determined by the one or more encoders and proceeding (160) with encoding the at least two video streams based on the selected encoding context.

Another example (e.g., example 47) relates to a previously described example (e.g., example 46) or to any of the examples described herein, further comprising that the encoding method comprises storing (150) each of the determined encoding contexts in the shared memory portion, and to update a pointer based on the selected encoding context.

Another example (e.g., example 48) relates to a previously described example (e.g., example 47) or to any of the examples described herein, further comprising that the pointer is used by each of the one or more encoders to access the selected encoding context.

Another example (e.g., example 49) relates to a previously described example (e.g., one of the examples 47 to 48) or to any of the examples described herein, further comprising that the encoding method comprises freeing (155) memory used for encoding contexts that have not been selected.

Another example (e.g., example 50) relates to a previously described example (e.g., example 46) or to any of the examples described herein, further comprising that the encoding method comprises storing (150) exclusively the selected encoding context in the shared memory portion.

Another example (e.g., example 51) relates to a previously described example (e.g., one of the examples 46 to 50) or to any of the examples described herein, further comprising that each of the one or more encoders is configured to use the selected encoding context to proceed with encoding.

Another example (e.g., example 52) relates to a previously described example (e.g., one of the examples 46 to 51) or to any of the examples described herein, further comprising that a first video stream of the at least two video streams is based on a predicted user behavior and a second video stream of the at least two video streams is based on an observed user behavior, wherein the encoding context is selected based on a difference between the predicted user behavior and the observed user behavior.

Another example (e.g., example 53) relates to a previously described example (e.g., example 52) or to any of the examples described herein, further comprising that the user behavior relates to a behavior of the user in a cloud video game.

Another example (e.g., example 54) relates to a previously described example (e.g., one of the examples 52 to 53) or to any of the examples described herein, further comprising that the second video stream is based on the observed user behavior up to a first point in time and the first video stream is based on the predicted user behavior up to a second point in time, with the second point in time being later than the first point in time, and with the selection being based on a difference between the predicted user behavior up to the second point in time and the observed user behavior up to the second point in time.

Another example (e.g., example 55) relates to a previously described example (e.g., one of the examples 52 to 54) or to any of the examples described herein, further comprising that the encoding method comprises obtaining (110) information on the observed user behavior from a video consumer device (105).

Another example (e.g., example 56) relates to a previously described example (e.g., example 55) or to any of the examples described herein, further comprising that the encoding method comprises generating (120) the at least two video streams based on the information on the observed user behavior.

Another example (e.g., example 57) relates to a previously described example (e.g., example 56) or to any of the examples described herein, further comprising that the encoding method comprises determining (115) the predicted user behavior based on the information on the observed user behavior and generating (120) the first video stream based on the predicted user behavior.

Another example (e.g., example 58) relates to a previously described example (e.g., one of the examples 56 to 57) or to any of the examples described herein, further comprising that the encoding method comprises generating (120) the at least two video streams using a video game engine, the first video stream being generated based on the predicted user behavior and the second video stream being generated based on the observed user behavior.

Another example (e.g., example 59) relates to a previously described example (e.g., one of the examples 52 to 58) or to any of the examples described herein, further comprising that the encoding method comprises generating (170) an encoded output video stream based on encoded frames of the one or more encoders, with the encoded frames being selected based on the difference between the predicted user behavior and the observed user behavior and providing (180) the output video stream to a consumer video device.

Another example (e.g., example 60) relates to a previously described example (e.g., one of the examples 43 to 59) or to any of the examples described herein, further comprising that the number of video streams equals the number of encoders.

Another example (e.g., example 61) relates to a previously described example (e.g., one of the examples 43 to 59) or to any of the examples described herein, further comprising that the number of video streams is greater than the number of encoders, with the one or more encoders being configured to perform encoding context switching on a frame-for-frame basis using the encoding contexts stored in the shared memory portion.

An example (e.g., example 62) relates to a computer system (100) being configured to perform the encoding method according to one of the examples 43 to 61 or any other example.

An example (e.g., example 63) relates to a system comprising a computer system being configured to perform the encoding method according to one of the examples 43 to 61 or any other example and a video consumer device (105), wherein the encoding method comprises providing (180) an encoded output video stream that is based on encoded frames of the one or more encoders to the video consumer device.

An example (e.g., example 64) relates to a non-transitory machine-readable storage medium including program code, when executed, to cause a machine to perform the encoding method of one of the examples 43 to 61 or any other example.

An example (e.g., example 65) relates to a computer program having a program code for performing the encoding method of one of the examples 43 to 61 or any other example when the computer program is executed on a computer, a processor, or a programmable hardware component.

An example (e.g., example 66) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An encoding apparatus comprising processing circuitry and memory circuitry, the processing circuitry being configured to:
   encode frames of at least two video streams to perform video compression encoding using one or more encoders, wherein the one or more encoders are each configured to determine an encoding context based on the video stream processed by the respective encoder, the encoding context comprising at least one or more reference frames determined by the respective encoder;
   store at least one of the encoding contexts determined by the one or more encoders in a shared memory portion of the memory circuitry that is accessible to the one or more encoders;
   select one of the encoding contexts based on which one of previous encoded frames of the at least two video streams is transmitted to a recipient of an encoded video stream; and
   proceed, using the one or more encoders, with encoding the at least two video streams based on the selected encoding context stored in the shared memory portion.

2. The encoding apparatus according to claim 1, wherein the one or more encoders are two or more encoders.

3. The encoding apparatus according to claim 1, wherein the encoding context comprises the reference frame and encoding statistics.

4. The encoding apparatus according to claim 1, wherein the processing circuitry is configured to store each of the determined encoding contexts in the shared memory portion, and to update a pointer based on the selected encoding context.

5. The encoding apparatus according to claim 4, wherein the pointer is used by each of the one or more encoders to access the selected encoding context.

6. The encoding apparatus according to claim 4, wherein the processing circuitry is configured to free memory used for encoding contexts that have not been selected.

7. The encoding apparatus according to claim 1, wherein the processing circuitry is configured to store exclusively the selected encoding context in the shared memory portion.

8. The encoding apparatus according to claim 1, wherein each of the one or more encoders is configured to use the selected encoding context to proceed with encoding.

9. The encoding apparatus according to claim 1, wherein a first video stream of the at least two video streams is based on a predicted user behavior and a second video stream of the at least two video streams is based on an observed user behavior, wherein the encoding context is selected based on a difference between the predicted user behavior and the observed user behavior.

10. The encoding apparatus according to claim 9, wherein the user behavior relates to a behavior of the user in a cloud video game.

11. The encoding apparatus according to claim 9, wherein the second video stream is based on the observed user behavior up to a first point in time and the first video stream is based on the predicted user behavior up to a second point in time, with the second point in time being later than the first point in time, and with the selection being based on a difference between the predicted user behavior up to the second point in time and the observed user behavior up to the second point in time.

12. The encoding apparatus according to claim 9, wherein the processing circuitry is configured to obtain information on the observed user behavior from a video consumer device.

13. The encoding apparatus according to claim 12, wherein the processing circuitry is configured to generate the at least two video streams based on the information on the observed user behavior.

14. The encoding apparatus according to claim 13, wherein the processing circuitry is configured to determine the predicted user behavior based on the information on the observed user behavior, and to generate the first video stream based on the predicted user behavior.

15. The encoding apparatus according to claim 13, wherein the processing circuitry is configured to generate the at least two video streams using a video game engine, the first video stream being generated based on the predicted user behavior and the second video stream being generated based on the observed user behavior.

16. The encoding apparatus according to claim 9, wherein the processing circuitry is configured to generate an encoded output video stream based on encoded frames of the one or more encoders, with the encoded frames being selected based on the difference between the predicted user behavior and the observed user behavior, and to provide the output video stream to a consumer video device.

17. The encoding apparatus according to claim 1, wherein the number of video streams equals the number of encoders.

18. The encoding apparatus according to claim 1, wherein the number of video streams is greater than the number of encoders, with the one or more encoders being configured to perform encoding context switching on a frame-for-frame basis using the encoding contexts stored in the shared memory portion.

19. A system comprising the encoding apparatus according to claim 1 and a video consumer device, wherein the processing circuitry of the encoding apparatus is configured to provide an encoded output video stream that is based on encoded frames of the one or more encoders to the video consumer device.

20. An encoding method comprising:
  encoding frames of at least two video streams to perform video compression encoding using one or more encoders, wherein the one or more encoders each determine an encoding context based on the video stream processed by the respective encoder, the encoding context comprising at least one or more reference frames determined by the respective encoder;
  storing at least one of the encoding contexts determined by the one or more encoders in a shared memory portion of memory that is accessible to the one or more encoders;
  selecting one of the encoding contexts based on which one of previously encoded frames of the at least two video streams is transmitted to a recipient of an encoded video stream; and
  proceeding, using the one or more encoders, with encoding the at least two video streams based on the selected encoding context stored in the shared memory portion.

21. A non-transitory machine-readable storage medium including program code, when executed, to cause a machine to perform the encoding method of claim 20.

\* \* \* \* \*